INVENTOR.
Joachim Kolbe

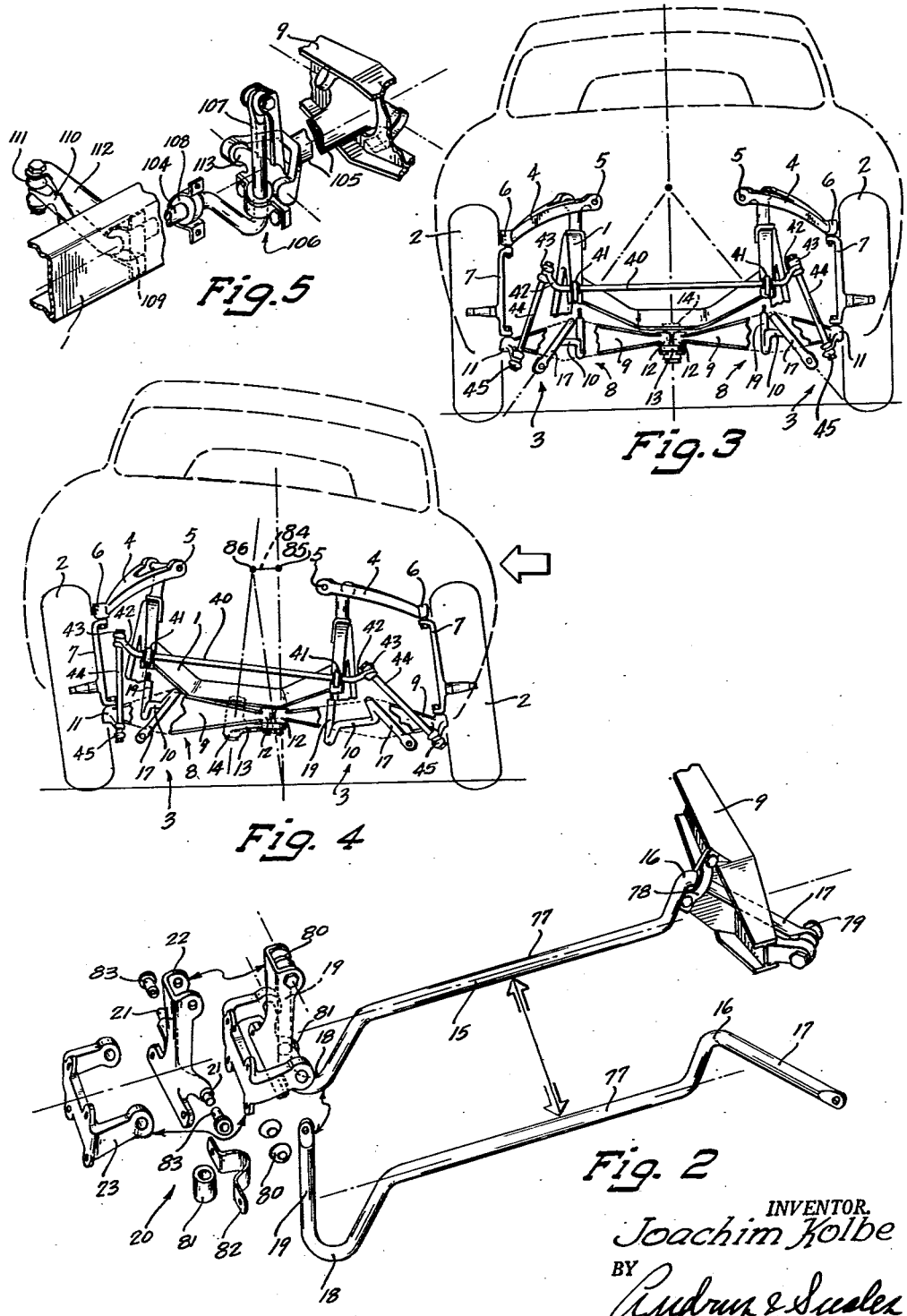

United States Patent Office 2,794,652
Patented June 4, 1957

2,794,652

VEHICLE SUPPORT TORSION SPRINGS WITH THEIR END SECTIONS BENT TO SERVE AS BANKING HINGES

Joachim Kolbe, Menomonee Falls, Wis.

Application July 18, 1955, Serial No. 522,434

21 Claims. (Cl. 280—112)

This invention relates to vehicles, and more particularly to an improved and multiple usage of related parts for automobiles designed to bank during curve ride, comprising resilient means stressed in torsion and interposed between the wheel supporting members and the superstructure.

Vehicles constructed to bank during curve ride are disclosed in a number of patents granted the present inventor. Patent Re. 21,605, issued October 22, 1940, disclosing link mountings, and Patent No. 2,576,686, issued November 27, 1951, disclosing banking arms are referred to by way of example.

The present invention includes structure found desirable for an improved functioning of a banking car having roll banking arms operated by torsion sway bars and inclined shackles, which is described in my copending application Serial No. 382,412, filed September 25, 1953, now Patent No. 2,760,785, issued August 28, 1956, and also having force diverters disposed between the superstructure and the banking running gear of the vehicle to provide rigidity between the two, which is described in my copending application Serial No. 400,313, filed December 24, 1953.

Banking arms and roll banking arms for banking cars, comprising wheel and axle suspensions including torsion springs employed to furnish the main resilient support for the superstructure and to simultaneously serve as linkage means for said suspensions, are described in my following copending patent applications: Serial No. 448,481, filed August 9, 1954, now Patent No. 2,739,658, issued March 27, 1956, and Serial No. 486,103, filed February 4, 1955.

The present application is also closely related to combined roll banking arm and oscillation structure, including torsion springs, described and illustrated in my copending application entitled "Torsional Acceleration Hinge Suspension For Banking and Nonbanking Vehicles," Serial No. 519,047, filed June 30, 1955.

This invention is directed to the specific and multiple use of certain suspension parts to thereby secure superstructure banking with fewer and simpler structural members.

One of the objects of this invention is to facilitate the use of torsion springs for the superstructure support of banking cars by combining torsional deflection with bending of the end sections of the resilient means and to thereby have the members in question fit more readily into the general space requirements of present day automobiles.

Another object is to provide for a simple and inexpensive anchoring of the ends of the torsion springs and to have the banking turn of selected wheel suspension members take place about said anchoring, having it serve as banking hinges.

Another object is to improve the wheel oscillation in general and to produce more desirable wheel rates and spring rates under all driving conditions.

Another object is to employ the anchoring of the torsion springs to operate in combination with hinges placed in correlated directions and to thereby form universal joints arranged to secure freedom for the banking turn of the superstructure.

Another object is to control the torsional deflection of the vehicle main support torsion springs during both oscillation of the wheels and banking of the superstructure in a simplified manner.

Another object is to provide suitable shapes for torsion springs bent in accordance with this invention and which meet the requirements of correct geometry needed for roll banking arm supported banking cars.

Another object is to correlate wheel suspension parts with banking car structure for the control of track holding and vibrations.

Another object is the provision of suitable steering linkage for the vehicle serving in combination with the suspension and banking means according to this invention.

Another object is the provision of suitable anchorage for the torsion springs serving in combination for the resilient support of the superstructure and functioning according to this invention.

The drawings furnished herewith illustrate the invention as presently contemplated and described hereinafter.

In the drawings:

Fig. 2 is a perspective view of a torsion spring assembly which is shaped and anchored in accordance with the invention, including parts attached thereto in assembled and disassembled form;

Fig. 3 is a front elevation of the vehicle illustrated in Fig. 1 in upright nonbanked position and showing the position of the torsion springs at that time;

Fig. 4 is a front elevation of the vehicle illustrated in Fig. 1 with the superstructure rolled into a banked position showing the position of the torsion springs during curve ride, and Fig. 5 is a perspective view of a torsion spring supported by the frame and anchored in accordance with the invention.

Figure 1:
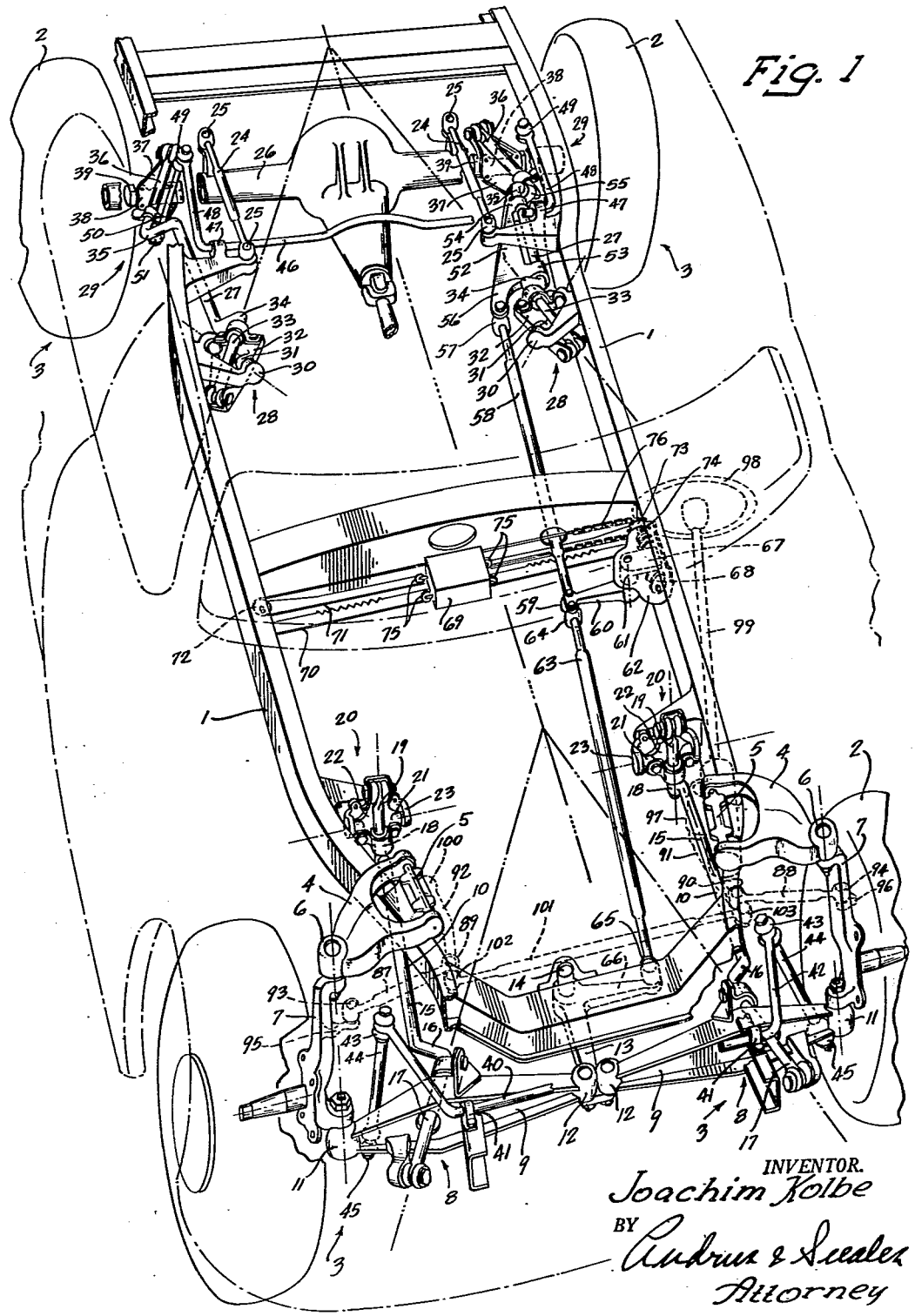
Figure 1 is a perspective view of a banking vehicle having roll banking arms and including wheel and axle suspension systems.

Fig. 1 illustrates a vehicle of the passenger automobile type having a superstructure or body shown in broken outline and having a chassis or body support frame 1 supported by the wheels 2 on the road. The wheels 2 are arranged in pairs, one pair at the front end and the other pair at the rear end of the vehicle. The wheels of each pair are disposed on opposite sides of the superstructure and are equally spaced from the longitudinal vertical center plane of the superstructure.

Wheels 2 are secured to superstructure 1 by wheel or axle carriers 3 which provide for a substantially vertical oscillation of each wheel relative to the superstructure. Carriers 3 are arranged in pairs similar to the wheels and each pair is employed for connecting the corresponding pair of wheels to the superstructure.

The front wheels 2 and their corresponding wheel carriers 3 form a front pair of roll banking arms which support the front end of the superstructure. Each front wheel carrier 3 comprises an upper control arm 4 pivotally attached to frame 1 by a substantially longitudinally extending hinge 5 and connected by a ball and socket joint 6 to a wheel supported member 7 which also serves as a steering king pin. In addition, each carrier 3 has a lower suspension arm 8 comprising a transversely extending leg 9 and a longitudinally extending leg 10. Leg 10 also serves as a vehicle main support torsion spring for the corresponding share of the weight of the vehicle.

The transversely extending leg 9 of each lower suspension arm 8 is pivoted at its outer end by a universally movable ball and socket joint 11 to the wheel supported member 7 and at its inner end by the universally movable ball and socket joint 12 to a longitudinally extending lever 13 pivoted by a substantially vertically placed pivot 14 to the frame 1. Lever 13 serves both transversely extending legs 9 as a common inner end support.

The longitudinal legs each comprise a torsion spring rod 15 which is provided at its forward end with a hook-like extension 16, shaped to coincide at its end section with the axis of a king pin banking hinge 17 and serving as a shaft for that hinge.

King pin banking hinges and their functions are disclosed and described in my copending application Serial No. 448,481, referred to above.

The rearward end of torsion spring rod 15 is provided with a similar hook-like extension 18, the outer end section of which is shaped to extend substantially vertically and thus constitutes the vertical shaft 19 of a universal joint 20. The horizontally extending shaft 21 of the universal joint 20 is carried by or formed as part of an intermediate member 22 connected by a universal joint fork 23 to the frame 1. The longitudinally extending main axis of the torsion spring rod 15 should intersect the king pin banking hinge axis 17 and the axis of the shaft 19 in order to secure the most effective use of the structure.

The shaft of hinge 17 is preferably inclined towards the longitudinal and transverse center planes extending intermediate the pairs of wheels of the vehicle and is supported by the transversely extending leg 9 to which it is connected by upper and lower rubber bushings described hereinafter, to permit a turn of the torsion spring 15 about the axis of the king pin banking hinge 17.

In Fig. 1, the rear axle carriers 3 each comprise an upper torque rod 24 connected by universally movable joints, such as ball and socket joints 25, at its forward end to the frame 1 and at its rearward end to a rigid axle housing 26. Each carrier 3 further comprises a longitudinally extending torsion spring 27 serving as lower suspension arm and supported at its forward end by a universal joint-like connection 28 and at its rearward end by a universal joint-like connection 29. Connection 28 comprises a fork 30 for a shaft 31 extending substantially horizontally, an intermediate support member 32 carrying said shaft 31 and giving support to a shaft 33 which constitutes the end section of a hook-like extension 34 provided on the forward portion of torsion spring 27. Shaft 33 is inclined to the road and both the shafts 33 and 31 are inclined towards the longitudinal and vertical center planes of the vehicle. The extension of the axial center line of each shaft 31 intersects the vertical longitudinal center plane of the vehicle at a point 114 located a greater distance from the longitudinal center line or axis of the rear axle housing 26 than the distance from the connection 28 to the axis of housing 26. The resulting direction of inclination of each shaft 31 relative to the vertical center plane produces the desired rotational windup of the torsion spring during vertical oscillation of the axle.

The rearward end of torsion spring 27 is provided with a similar hook-like extension 35, the outer end section of which is shaped to extend substantially parallel to shaft 33 and serves as one shaft 36 for one hinge of the universal joint-like connection 29. Shaft 36 is carried by an intermediate support member 37 which carries the other shaft 38 for universal joint 29. Shaft 38 extends substantially horizontally and transversely and is attached by a hinge fork 39 to the rear axle housing 26.

A sway bar 40 is attached in the front of the vehicle by bearings 41 to the frame 1. The outer ends of the sway bar 40 form longitudinally extending sway bar arms 42 which are connected by pivotal or rubber bearings 43 to inclined sway bar shackles 44. The shackles 44 are connected by pivotal or rubber bearings 45, which are spaced farther apart than the upper shackle bearings 43, to the outer ends of the transversely extending legs 9 of the lower front suspension arms 8.

In the rear of the vehicle a similar sway bar 46 may be added and is illustrated as being supported by bearings 47 to the frame 1. Sway bar 46 has longitudinally extending arms 48 on either end, which are connected by upper pivotal or rubber bearings 49 to the inclined shackles 50 with lower pivotal or rubber bearings 51, also spaced farther apart than the upper pivots 49, connecting the shackles 50 to the rear axle housing 26.

An interconnecting member 52 is attached through bearings 53, 54 and 55 to the left rear torsion spring 27 in a manner permitting torsional deflection of spring 27 without permitting a turn of the member 52 about the longitudinal center axis of the spring 27 by placing the bearing 55 outside said axis of the torsion spring 27. The interconnecting member 52 carries an arm 56 which supports a ball and socket joint 57 placed in the horizontal transverse center axis of the universal joint 28. Member 52 constitutes part of a tie, provided in effect between the front and rear pairs of wheels to secure proper track holding for the vehicle.

A longitudinally extending tie rod 58 carries at its rearward end ball and socket joint 57 and at its forward end a ball and socket joint 59 which is carried by a substantially horizontally and transversely extending lever 60 which is disposed to turn about a substantially vertically extending pivot 61 supported by a housing 62 attached to the frame 1.

A second longitudinally extending tie rod 63 carrying at its rearward end a ball and socket joint 64 which is supported also by the lever 60, and carrying at its forward end a ball and socket joint 65, interconnects lever 60 with a transversely extending lever 66 which forms a bell crank to the centrally located lever 13 in the front of the vehicle.

The transversely extending lever 60 is located intermediate the pairs of wheels and forms an integral part with an arm 67 extending into the housing 62 and constituting a cam lever which engages an irreversible worm gear 68 to form a force diverter mechanism, such as that disclosed in my application Serial No. 400,313, referred to above.

The force diverter mechanism has its release weight 69 supported by two guide wires 70 and 71 extending transversely of the frame 1. Guide wire 70 is directly attached at both ends to the frame 1. Guide wire 71 has a loop slung at one end about a guide wheel 72 carried by the frame 1 and another loop slung at the other end about a toothed guide wheel 73 carried by a shaft 74 which also carries the worm gear 68, enclosed by the housing 62 for the force diverter. Rollers 75 are interposed between the release weight 69 and the guide wires 70 and 71 to reduce frictional resistance during operation of the mechanism. The corresponding section of the looped guide wire 71 which engages the toothed guide wheel 73 forms a chain 76 to secure more direct operation of the mechanism. The arrangement illustrated serves also as a speedup mechanism described as an essential part of a force diverter unit in my copending application Serial No. 400,313, referred to above.

The vehicle illustrated constitutes a banking car and operates as follows:

When the vehicle is driving into a curve the inclined shackles 44 and 50 for the corresponding sway bars 40 and 46 located in the front and rear of the vehicle respectively will be compressed when located on the outside curve and operated in tension when located on the inside curve. Reaction loads on the frame 1 are transmitted by the sway bars 40 and 46 and will tend to lift the superstructure on the outside curve, and lower it on the inside curve, thereby turning the superstructure about an effective longitudinally extending banking motion center axis located approximately in the height of the mass of the superstructure into the desired banked position.

This turn will be a part of a lateral shifting of the lower part of the superstructure towards the outside curve and, to a greater extent due to the greater height, a shifting of the upper part of the superstructure towards the inside curve. All hinged connections between the longitudinally extending and the transversely extending suspension members, such as the hinges 17 in the front and the universal joints 29 in the rear, will operate but substantially keep their axial positions relative to the road. All hinged connections between the longitudinally extending suspension members and the frame 1, however, such as universal joints 20 in the front and the universal joint 28 in the rear, will not only operate but simultaneously travel with the shifting frame 1 into the banked position.

Since the banking geometry, determined in substance by the inclination of the banking hinges and the sway bar shackles, is such that a turn is provided large enough in degrees to compensate for the outward lean of the superstructure normally taking place and to add an amount of turn of corresponding size in degrees in order to secure actual banking, the torsion springs 10 in the front and 27 in the rear will at the end of the banking turn be stressed the same amount as is typical for nonbanking vehicles negotiating curves under equal conditions.

The superstructure, for instance, might turn during average and safe speed for a given curve 16° about its banking motion center and simultaneously be allowed to lose 8° due to the spring deflection with a resulting actual banked position of 8°.

The desired turn of the superstructure can occur because the irreversible worm gear 68 is turned by the shifting of the release weight 69 under the influence of centrifugal force. The turn of the worm gear 68 operates the lever 60, permitting a longitudinal shifting of the tie rods 58 and 63 and therewith the lateral shift of the lower part of the superstructure relative to the wheels and the rolling of the superstructure into the desired banked position.

It is the primary object of this invention, as stated above, to provide improvements and simplifications in construction of certain parts and their functioning for the banking car structure described. The invention is directed especially to the shaping, anchoring, and use of the torsion springs 15 and 27 within said structure.

For passenger automobiles with desired low wheel rates the torsion springs would have to be relatively long where their resiliency is derived from a straight longitudinally extending rod only under consideration of acceptable surface stresses.

Fig. 2 illustrates a torsion spring shaped in accordance with this invention and including related parts interconnected to it. The torsion spring shown will be stressed in torsion within its center section 77, in bending within its outer end sections 17 and 19 and in a combination of both kinds of stresses in those sections which form the actual hooks 16 and 18.

This stressing of the springs 15 and 17 takes place in combination with a serving of each outer end section of each spring as one shaft of a corresponding universal joint or a single hinge disposed to permit the banking turn of the superstructure relative to the road. Since for each hinge the bending of the corresponding shaft will not materially influence the position of the hinge axis, as determined for instance in the design illustrated in Fig. 2 by the corresponding upper bearing 78 and lower bearing 79 for the shaft of the king pin banking hinge 17, and by the upper bearing 80 and the lower bearing 81 for the shaft 19, an overall simplification of arrangement is achieved, which might greatly assist in the acceptance of the banking car structure as a whole.

Fig. 2 illustrates the bearings 78, 79, 80 and 81 as ring bearings which should consist of material of sufficient resiliency, such as rubber, to permit axial movement of the shafts 17 and 19 relative to the members supporting them, such as the transversely extending leg 9 of the lower front suspension arm 8, a section of which is illustrated in Fig. 2, and such as the intermediate support member 22.

The use of rubber bearings placed to operate as illustrated constitutes in itself an additional resilient means which can be shaped and employed to favorably influence the final wheel rates.

The main members of the universal joint 20 illustrated in assembled and disassembled position at the rear end of torsion spring 15 comprise, besides the vertical shaft 19 and besides the member 22, also the rubber bushings 80 and 81 carried by the shaft 19, with a cover strap 82 for the bushing 81, the bushings 83 placed between the horizontal shaft 21 of the intermediate support member 22 and the fork 23. The forward end supports of the spring 15 are not detailed since a single hinge only is needed at that end of the spring and is so illustrated.

Figs. 3 and 4 illustrate the vehicle shown in Fig. 1 in front elevation in upright and in a banked position respectively with corresponding reference characters applied and with emphasis on the position of the torsion spring with its end sections shaped according to this invention.

Fig. 4 indicates in dotted outline the travel path 84 of the superstructure mass shown as concentrated in point 85 moving into position 86. It is this shift which in effect causes all spring deflections, the turning and shifting of all correlated hinges and members and of the superstructure itself as described.

In Fig. 1 the front wheels of the vehicle illustrated are shown as being steered individually by the drag-links 87 and 88, the inner ends of which are connected by ball and socket joints 89 and 90 placed substantially into the axes of the upper inner hinges 5, connecting the upper front suspension arms 4 to the frame 1, to longitudinally extending steering support arms 91 and 92, respectively. The draglinks 87 and 88 extend substantially parallel to the upper front suspension arms 4, and are connected by ball and socket joints 93 and 94 to the steering arms 95 and 96 carried by the corresponding wheel supported members 7. The steering support arm 91 is pivotally carried by steering gear mechanism within the steering gear housing 97 of any arrangement common to automobiles and operated by the driver by means of the steering hand wheel 98 and the steering column 99. The steering support arm 92, located on that side of the superstructure which does not carry the steering gear housing, is connected to the frame by the hinge 100 extending substantially parallel to the hinge supporting the arm 91. A transversely extending connecting rod 101 is pivotally attached to the outer ends of the steering support arms 91 and 92 by ball and socket joints 102 and 103 and secures substantially unison movement of said arms 91 and 92 during steering operation.

Since the desired banking motion of the superstructure relative to the wheels for the vehicle illustrated in Fig. 1 during curve ride will result in a reversal of oscillation position for the upper arms 4 only as compared to that taking place in standard cars, the steering linkage will not participate in any lateral movement which might unfavorably affect the chosen position of the front wheels, and can therefore be worked out to satisfy correct steering geometry.

Fig. 5 illustrates structure wherein a corresponding torsion spring 104 is carried by the frame 1 and the turn motion of the transversely extending leg 9 of the lower suspension arm 8, taking place about the inner ball joint 12 (not shown) during oscillation of the corresponding wheel 2 is transmitted by the longitudinally extending leg 105 here constituting a rigid member attached to the universal joint 106. The vertically extending shaft 107 of the universal joint 106 here constitutes the end section of the torsion spring 104 which is attached to the frame by rubber bushings 108 and 109, permitting torsional deflection of the forward section of the spring 104 relative to its rearward section. The rearward end is bent to form an arm 110 extending in a direction substantially transversely of the vehicle with an additional rubber bearing 111 at the outer end of the arm 110 and supported by a bracket 112 carried by the frame 1. The arm 110 will deflect in bending during the loading of the spring 104 similar to the forwardly located vertically extending shaft 107. The horizontal shaft 113 of the universal joint 106 is carried by the longitudinally extending leg 105 of the lower suspension arm.

The arrangement illustrated in Fig. 5 applies the unification of spring member and hinge shaft to the front end of the spring 104 only, but functions there according to this invention and identically to the arrangements described above.

Various modes of carrying out the invention are contemplated as within the scope of the following claims particularly pointing out and distinctly claiming the subject matter which is regarded as the invention.

I claim:

1. A vehicle comprising a superstructure adapted to roll bank on turns, torsion spring resilient means for the support of the superstructure, pairs of opposed roll banking arms disposed to carry the superstructure, the arms of each pair spaced laterally apart on opposite sides of the longitudinal and vertical center plane of the vehicle, each roll banking arm extending between the superstructure and the effective road support therefor and having in effect a universally movable joint at one end and a skew pivotally effective banking axis at the other end, each universally movable joint for at least one pair of banking arms being carried by a rigid transversely extending vehicle axle, one axis of said universally movable joint extending substantially horizontally and the other axis extending inclined to the road and towards said center plane and intersecting said center plane at a point located above the road and spaced farther away from the rigid axle than the center point of the corresponding universally movable joint, each said skew pivotally effective banking axes constituting one axis of a universal joint carried by the superstructure, the other axis of said superstructure supported universal joint extending substantially horizontally and inclined towards said center plane of the vehicle, said resilient means being disposed so that one corresponding axis of each of said universal joints constitutes the hinge axis of a hinge provided by the corresponding bearing supported outer end section of the respective torsion spring.

2. The structure of claim 1 wherein the corresponding axis of each of said universal joints serving predominantly the banking turn for the vehicle superstructure constitutes the hinge axis of a hinge furnished by the corresponding bearing supported outer end section of the respective torsion spring.

3. A vehicle comprising a superstructure adapted to roll bank on turns, independently suspended front wheels, a rigid rear axle supported by the rear wheels, resilient means for the support of the superstructure upon said front wheels and said axle and comprising two pairs of opposed roll banking arms disposed to carry the superstructure, the arms of each pair being spaced laterally apart on opposite sides of the longitudinal and vertical center plane of the vehicle, each rear roll banking arm being disposed between said rigid axle and the superstructure and comprising a pair of vertically spaced longitudinally extending arms, one of said longitudinal arms on each side of the vehicle constituting a torsion spring connected at one end by a two axes universal joint to said rigid axle with one of the axes extending substantially horizontally and transversely and the other axis extending substantially inclined to the road and to said plane, and connected at the other end by a two axes universal joint to the superstructure with one of the axes extending substantially horizontally and inclined to said center plane and with the other axis extending inclined to the road and to said center plane, said inclined axes intersecting said center plane at points located outside the transversely and vertically extending plane containing the centers of said last-named universal joints, each roll banking arm of the other pair located in the front of the vehicle extending from the superstructure to the effective road support therefor with the ends of the arms for the pair of roll banking arms embodying in effect a universally movable joint at the corresponding end of each arm and a skew pivotally effective banking axis at the other end of the arm, means including a longitudinally extending lever located intermediate the wheels and interconnecting the roll banking arms of the front pair to retain said effective universally movable joints for the pair in substantially constant spaced relation, each front roll banking arm including an upper wheel suspension arm hingedly connected to the frame and including a lower wheel suspension arm comprising a transversely and a longitudinally extending leg, a king pin banking hinge pivotally interconnecting the outer ends of said legs and placed to provide said skew pivotally effective banking axis, the longitudinally extending leg of each pair constituting a torsion rod carrying at its inner end a universal joint supported by the superstructure, said universal joint comprising a vertically and also a horizontally and transversely extending axis, all said horizontally extending axes of all universal joints located in the front and in the rear of the vehicle serving predominantly the vertical oscillation movements of the superstructure, and all the corresponding other hinges of all said universal joints serving predominantly the banking motion of the superstructure, whereby the hinges for said axes serving predominantly the banking turn of the superstructure are furnished by the outer end sections of the corresponding torsion rods.

4. The combination of claim 3, wherein the axis of each longitudinally extending torsion spring substantially intersects the axis of each hinge of the corresponding universal joint and the skew pivotal banking hinge supporting said torsion spring.

5. The combination of claim 3, wherein each torsion spring forming a part of a corresponding roll banking arm comprises a substantially longitudinally extending center section stressed mainly in torsion, an arced section located intermediate the center section and the end section for each end of the torsion spring and stressed mainly in both torsion and bending, and said end sections stressed mainly in bending.

6. The combination of claim 3, wherein each universal joint located at the outer end of the corresponding longitudinally extending torsion spring comprises a center plate to which the corresponding outer end section of each of said torsion springs is pivotally attached.

7. The combination of claim 3, wherein each universal joint located at the outer end of the corresponding longitudinally extending torsion spring comprises a center plate to which the corresponding outer end section of each of said torsion springs is pivotally attached, and wherein the means of pivotal attachment of said outer end sections of said torsion springs to said center plates are rubber bearings spaced a sufficient distance apart along said outer end sections, and arranged to additionally serve as resilient support for the superstructure.

8. The combination of claim 3, wherein each universal joint located at the outer end of the corresponding longitudinally extending torsion spring comprises a center plate to which the corresponding outer end section of each of said torsion springs is pivotally attached, wherein the means of pivotal attachment of said outer end sections of said torsion springs to said center plates are rubber bearings spaced a sufficient distance apart along said outer end sections, and arranged to additionally serve as resilient support for the superstructure, and wherein the bearing located at the outermost end of each of said torsion springs is anchored to the corresponding center plate by a shaft extending perpendicular to the direction of the corresponding banking hinge axis, to avoid displacement between said center plate and said banking hinge in the direction of said banking hinge.

9. The combination of claim 3, wherein said skew pivotal banking hinges interconnecting said longitudinally extending legs with the transversely extending legs of said lower front vehicle suspension arms, and furnished by the outer end sections of the corresponding torsion springs are supported by rubber bearings spaced a given distance apart along said skew pivotal banking axes and are arranged to additionally serve as a resilient support for the corresponding share of the superstructure.

10. The combination of claim 3, wherein said skew pivotal banking hinges interconnecting said longitudinally extending legs with the transversely extending legs of said lower front vehicle suspension arms, and furnished by the outer end sections of the corresponding torsion springs are supported by rubber bearings spaced a given distance apart along said skew pivotal banking axes and are arranged to additionally serve as a resilient support for the corresponding share of the superstructure, and wherein the bearing located at the outermost end of each of said torsion springs is anchored to said transversely extending leg by a shaft extending perpendicular to the direction of the corresponding banking hinge axis, to avoid displacement between said center plane and said banking hinge in the direction of said banking hinge.

11. The combination of claim 3 wherein are provided in combination additional resilient means and related guiding means disposed to roll the superstructure into a banked position during curve ride, a tie interconnecting the front and rear superstructure support structure, a self-locking reduction gearing carried by the superstructure and connected to said tie to block relative lateral shifting between the superstructure and wheels tending to result from wheel road shock forces, and resilient control means operable in response to vehicle front wheel steering operation to actuate said reduction gear in a direction adjusting said blocking to permit for movement of said tie and banking of the superstructure.

12. The combination of claim 3 wherein a pair of steering draglinks for the steering of the front wheels of the vehicle is arranged in the height of said upper wheel suspension arms, each draglink extending substantially parallel to the corresponding upper suspension arm located on either side of the vehicle and supported at its outer end by a steering arm carried by the spindle support member and at its inner end by a longitudinally extending superstructure supported steering support arm and operated by steering linkage and mechanism supported by the superstructure and comprising steering handwheel operated steering gear carried by a steering gear housing, one of said longitudinally extending steering support arms carried by said steering gear housing, and a rod connecting said steering support arms and arranged to operate the same substantially in unison during steering operation for the vehicle.

13. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, a torsion spring supporting a corresponding share of the superstructure, a universal joint connecting each longitudinally extending leg at its inner end to said torsion spring, an inclined king pin banking hinge connecting each longitudinally extending leg at its outer end to the corresponding transverse leg intermediate the ends of the latter, a pivotal support for the inner ends of said transverse legs pivotally carried by the superstructure, a ball and socket joint connecting the outer end of each transverse leg to the corresponding wheel spindle member, and leverage and linkage means stabilizing the position of said pivotal support to control the banking of the superstructure on turns, each rear wheel carrier including a longitudinally extending lower suspension arm comprising a torsion spring connected at one end by a universal joint to the rear axle with one of the two hinges of the universal joint positioned to serve as a roll banking hinge and connected at the other end by a universal joint to the superstructure, said last-named universal joint comprising one hinge inclined to the road and to the longitudinal vertical center plane of the vehicle and comprising another hinge extending substantially parallel to the road and arranged substantially parallel in plan view to the first-named hinge of said last-named universal joint, one axis of each of said universal joints being provided by a corresponding end of said front and rear torsion springs bent into a direction extending at an angle to the direction of the center section of said torsion spring and in a direction established by the corresponding axis of the universal joint furnished thereby, end sections anchored to the superstructure and the other a front to rear tie connecting at least one wheel carrier disposed in the front of the vehicle to one wheel carrier disposed in the rear of the vehicle to induce the front and rear wheel carriers to move laterally substantially in unison during the roll banking of the superstructure, means connecting the superstructure and said front to rear tie including irreversible gear mechanism and rigidly preventing relative lateral movement between the wheels and the superstructure, and means including resilient control means responsive to vehicle engine forces to release said preventive means to permit relative lateral movement between the superstructure and the running gear for banking of the superstructure.

14. The combination of claim 13 wherein the rear end of said front to rear tie is connected to said wheel carrier disposed in the rear of the vehicle by a ball and socket joint located in a transversely extending axis containing the point of intersection of the two axes of the universal joint connected to the forward end of the corresponding rear torsion spring.

15. A vehicle comprising a superstructure adapted to roll bank on turns, longitudinally extending torsion rods for the support of the superstructure, pairs of opposed roll banking arms comprising said torsion rods and disposed to carry the superstructure, the arms of each pair spaced laterally apart on opposite sides of the longitudinal and vertical center plane of the vehicle, each roll banking arm extending between the superstructure and the effective road support therefor with the ends of the arms for each pair of roll banking arms embodying in effect a universally movable joint at one corresponding end of each arm and a skew pivotally effective banking axis at the other end of the arm, each said universally movable joints comprising a universal joint with one axis thereof extending substantially horizontally and the other axis extending substantially inclined to the road and with both said axes extending inclined towards said center plane and intersecting said center plane at points located above the road and spaced farther away from the corresponding rigid axle than the center point of the corresponding universal joint, said universal joint being arranged to turn about its longitudinally and horizontally extending center axis in opposition to said resilient means carried by the superstructure, said skew pivotally effective banking axes each constituting one axis of a universal joint, the other axis of said last-named universal joint extending substantially horizontally and transversely of the vehicle, whereby the wheel rates established by the wheel upward movement of the pair of wheels supporting said rigid axle are substantially the same for a one-wheel-up movement with the other wheel stationary and for a one-wheel-up movement with the other wheel down movement, all up movement constituting a vertical movement of the corresponding wheel towards the frame, and whereby each end section of said longitudinally extending torsion rods is shaped to furnish one hinge for a corresponding universal joint located at each end of said torsion rods.

16. A vehicle comprising a superstructure adapted to roll bank on turns, at least one rigid axle, a plurality of sets of front and rear wheel carriers disposed to support said superstructure and spaced longitudinally of the same, each set of carriers together with the wheels associated therewith constituting at least a pair of opposed roll banking arms arranged to secure a roll banking motion center located in the height of the center of gravity of the superstructure, resilient means associated with each carrier and disposed to provide for relative vertical oscillation between the superstructure and the point of effective road support for the corresponding banking arm, said roll banking arms each including a lower suspension arm comprising said resilient means and constituting a longitudinally extending torsion rod and carrying a universal joint at each end, one of said universal joints comprising a roll banking hinge, the other of said universal joints including a hinge extending substantially horizontally and inclined to the longitudinal vertical center plane of the vehicle and arranged to operate said resilient means during oscillation of the corresponding wheel, said roll banking hinge having an axis located inclined towards the median plane and the vertical transverse planes for the vehicle intersecting the wheel centers and securing freedom for the superstructure to roll about an effective motion center located approximately in height of its center of mass, the outer sections of said torsion rods each serving as a hinge member for one hinge of the corresponding universal joint located at the end of the corresponding torsion rod, additional resilient means in the form of a bar carried by the superstructure at at least one end and connected to the outer ends of the wheel carriers by means of shackles arranged to secure roll banking about the banking motion center, a tie connecting at least one front roll banking arm to one rear roll banking arm, whereby the wheel rates established by the wheel upward movement of the pair of wheels supporting said rigid axle are substantially the same for a one-wheel-up movement with the other wheel stationary and for a one-wheel-up movement, the other wheel down movement.

17. A vehicle comprising wheels and a superstructure adapted to roll bank on turns, resilient means comprising torsion rods for the support of the superstructure serving as suspension arms for said wheels and constituting a pair of opposed roll banking arms arranged in pairs and disposed to carry the superstructure, the arms of each pair being spaced laterally apart on opposite sides of the longitudinal and vertical center plane of the vehicle, and the arms of at least one pair extending between the superstructure and a rigid axle, each roll banking arm of said last-named pair of arms extending between the superstructure and said rigid axle structure with the ends of the arms for said pair of roll banking arms embodying in effect a universal joint at each corresponding end of each arm, said universal joints being constructed and arranged with the axes of the corresponding hinges serving predominantly the oscillation movements of the corresponding wheels and located in a common plane extending substantially parallel to the road, said axes intersecting each other under an angle of approximately 45° with the point of intersection located at the same side as said suspension arm and a greater distance away from said center plane than said suspension arm, whereby all hinges serving predominantly the roll banking turn of said roll banking arms relative to the superstructure are formed by the end sections of said torsion rods.

18. The combination of claim 17 whereby said universal joints are so constructed and arranged that the axes of the corresponding hinges serving predominantly the banking motion of the superstructure extend inclined to the road and substantially parallel to each other and are located in a common plane inclined to said center plane with the line of intersection of said plane extending longitudinally substantially in height of the center of mass of the superstructure.

19. The combination of claim 17 wherein each said universal joint located at the outer end of the corresponding longitudinally extending torsion rod comprises a center plate to which said outer end sections of said torsion rods are pivotally attached.

20. A combination of claim 17 wherein the means of pivotal attachment of said outer end sections of said torsion rods to said center plates are rubber bearings spaced longitudinally apart along the axis of the corresponding end sections, and are arranged to additionally serve as a resilient support for the superstructure.

21. The combination of claim 17 wherein the outer end sections of said torsion rods are characterized by hook-like extensions and straight end sections, said end sections serving as shafts for the corresponding hinges arranged to secure the turn of the wheel carriers relative to the wheels and to the superstructure during banking of the superstructure while the vehicle negotiates a turn.

References Cited in the file of this patent

UNITED STATES PATENTS

| | | |
|---|---|---|
| 2,580,559 | Kolbe | Jan. 1, 1952 |
| 2,657,067 | Kolbe | Oct. 27, 1953 |